Figure 6:
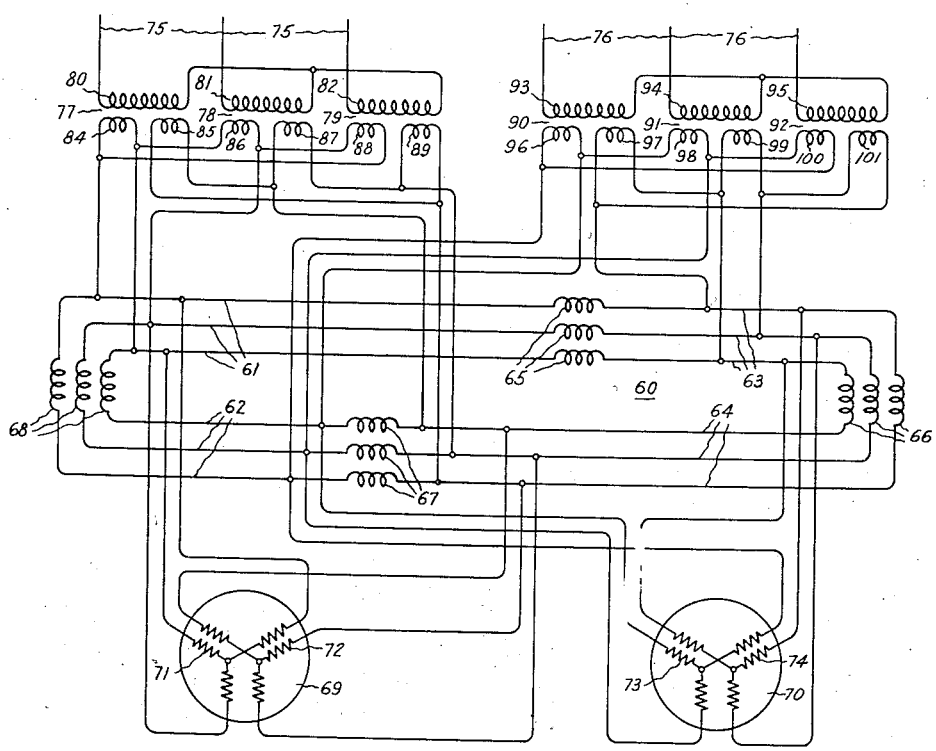

Feb. 21, 1939.   F. F. BRAND   2,148,289
SYSTEM OF ELECTRICAL DISTRIBUTION
Filed Dec. 14, 1937   3 Sheets—Sheet 1
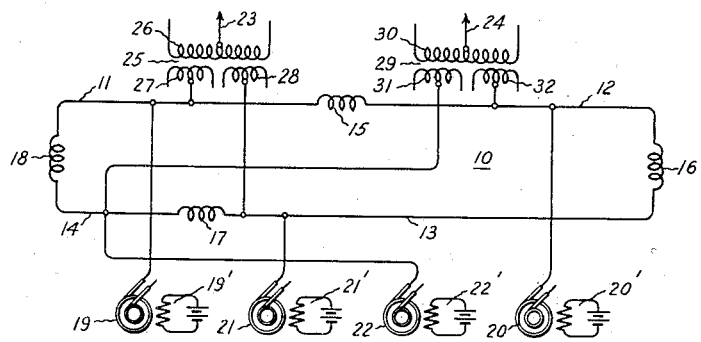
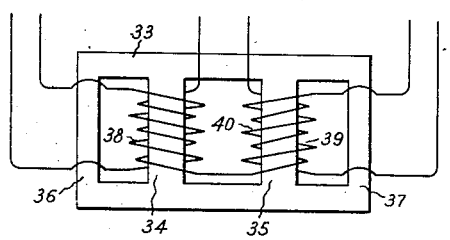
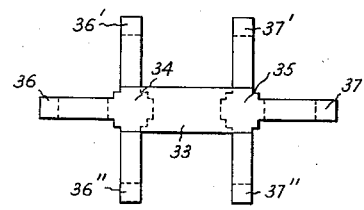
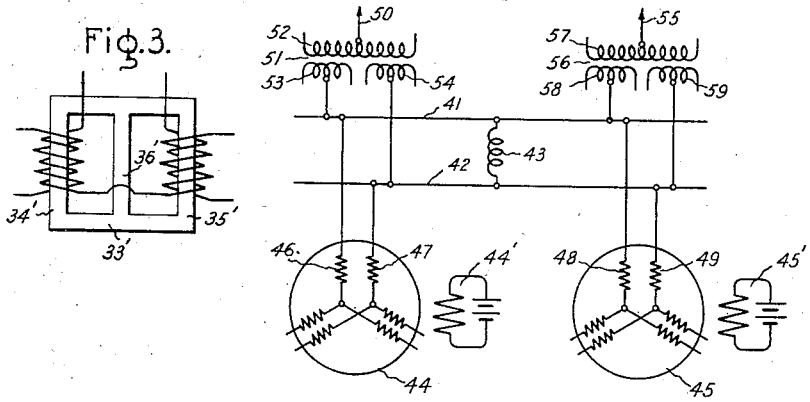
Inventor:
Frederick F. Brand,
by Harry E. Dunham
His Attorney.

Inventor:
Frederick F. Brand,
by Harry E. Dunham
His Attorney.

Patented Feb. 21, 1939

2,148,289

UNITED STATES PATENT OFFICE 2,148,289

SYSTEM OF ELECTRICAL DISTRIBUTION

Frederick F. Brand, Pittsfield, Mass., assignor to General Electric Company, a corporation of New York Application December 14, 1937, Serial No. 179,699

18 Claims. (Cl. 171—97)

My invention relates to systems of electric distribution and more particularly to busbar systems and systems of connections for central generating stations and sub-stations of distribution systems.

With the development of large central stations and large generating units, large amounts of power are concentrated on a single bus or bus section, making the system susceptible to highly destructive phenomena upon the occasion of faults or disturbances, unless suitable power limiting means are provided. Reactance coils or power limiting reactors have been used heretofore in single, double or triplicate busbar systems to sectionalize buses so as to limit the fault current in various parts or elements of the system. However, a reactance above a critical value between synchronous machines reduces the synchronizing power and may cause hunting or complete loss of synchronism during faults or system disturbances. An important development in busbar systems has been the utilization of large double-winding generators as disclosed in United States Letters Patent No. 1,815,823 granted July 21, 1931, upon an application of Theophilus F. Barton in which the respective windings are connected to different bus sections so as to reduce or eliminate the number of bus sectionalizing reactors, reduce the size of the generator circuit breakers which would be required for a single winding generator of the same total capacity and provide higher reactance and greater protection to short-circuit currents without jeopardizing synchronous operation.

In any busbar system which is sectionalized by reactance, if the load distribution is unequal, or is not a constant ratio of the generator capacity connected to the individual sections of the bus, the current flows from one section of the bus to the other through the connecting reactances. This will bring about a difference in magnitude and phase of the voltage on the different bus sections. If double winding generators are connected to different sections of the bus with an intervening reactor or reactors, the difference in voltage or phase exists on the different bus sections. The generator windings, whether of the double winding generator or of two single generators may not supply equal currents to the bus and in order to do so it is necessary to provide some balancing means. Furthermore, in a system in which the power supply to any one feeder is very large, it is frequently desirable to supply this feeder so as to limit the destructive effects of short circuits.

It is an object of my invention to provide a new and improved arrangement in electric systems of distribution and busbar systems of central generating stations and substations for improving the power control and stability of the systems.

It is another object of my invention to provide a new and improved system of connections in busbar systems for obtaining proper balance between the currents of different generators or different windings of double or multiple-winding generators, at the same time permitting a difference in magnitude and phase of the voltage of the respective generators or windings of a single generator relative to their points of connection in the system.

It is a further object of my invention to provide a new and improved transforming device for interconnecting a plurality of voltage sources with a single load circuit.

It is a still further object of my invention to provide a new and improved multiple winding transformer having a plurality of independent primary windings and a single secondary winding so that voltages differing somewhat in magnitude and phase may be applied to the respective primary windings, while at the same time maintaining the current of the ampere turns of each primary winding equal.

In accordance with the illustrated embodiments of my invention, I combine in one transformer a balancing arrangement and a divided circuit so that this transformer can be used to balance current taken from two generators or the two windings of a single double-winding generator, at the same time permitting a difference in the magnitude and phase of the voltages supplied to the two primary windings of this transformer. The windings of the transformer are arranged so that in the event of a short-circuit on one of the primary windings connected to a given bus section, high reactance will be introduced to prevent current being fed back from the other primary winding or from the high voltage secondary winding.

Figure 7:
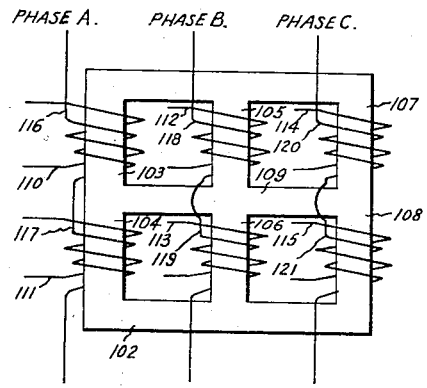
Figure 8:
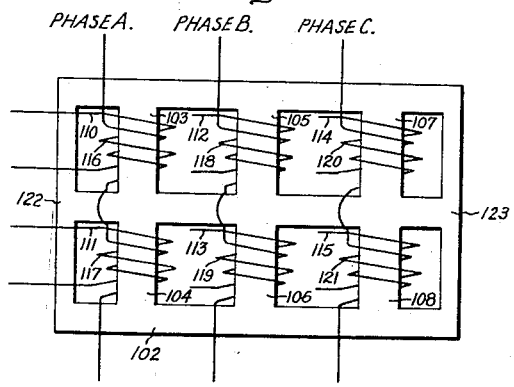

The novel features which I believe to be characteristic of my invention are set forth with particularity in the claims forming a part of this specification. The invention itself, however, both as to organization and method of operation together with further objects and advantages thereof will be better understood by reference to the following description taken in connection with the accompanying drawings in which Fig. 1 is a diagrammatic representation of an embodiment of my invention in connection with single winding generators; Figs. 2, 3 and 4 are diagrammatic representations of a form of transformer embodying my invention; Fig. 5 is a modification of the embodiment of my invention illustrated in Fig. 1 for a double bus and double-winding generators; Fig. 6 is a diagrammatic representation of an embodiment of my invention for double-winding generators in a ring bus with sectionalizing reactors; and Figs. 7 and 8 are polyphase forms of transformers embodying my invention.

Referring to Fig. 1 of the drawings, 10 indicates a power station bus of the ring type. For purposes of simplicity, a one-line diagrammatic representation has been used in this figure, as well as in Fig. 5 to illustrate all of the circuits except the armature and field windings of the generators. The bus 10 may comprise any number of sections but, for purposes of illustration, I have shown four sections 11, 12, 13 and 14, respectively. The bus sections have interposed therebetween suitable bus sectionalizing reactors 15, 16, 17 and 18. The usual bus sectionalizing switches and bus reactor switches have not been shown but it is to be understood the usual switches will be used in a complete system in accordance with the known practice. To the respective bus sections 11 to 14, inclusive, I connect the generators 19, 20, 21 and 22, respectively. Each generator is provided with suitable excitation means 19', 20', 21' and 22' very diagrammatically shown as comprising a field winding and a source of voltage.

The bus system is arranged to supply energy to distribution or feeder circuits and, by way of illustration, I have shown two feeder circuits 23 and 24. The feeder circuit 23 is supplied with energy by a transformer 25 having a high voltage secondary winding 26 and two primary windings 27 and 28. The primary winding 27 is connected, for example, to bus section 11 and hence directly to generator 19, and the primary winding 28 is connected to a different bus section separated by a bus sectionalizing reactor, or reactors, and as shown is connected to bus section 13 and consequently directly to generator 21. As illustrated, two bus reactors intervene between the respective generator terminals and consequently between the respective primary windings 27 and 28. Similarly, the feeder 24 is connected to be energized through a transformer 29 having a high voltage secondary winding 30 connected to the feeder 24 and two primary windings 31 and 32 connected to be energized from the bus sections 14 and 12, respectively. In this case, the primary winding 31 is energized directly from generator 22 and the primary winding 32 is energized directly from generator 20. It will, of course, occur to those skilled in the art that additional generators and feeders may be connected to the same bus system, in accordance with this embodiment of my invention, without departing from my invention in its broader aspects.

In Figs. 2 and 3, I have shown forms of transformers diagrammatically represented by the transformers 25 and 29 of Fig. 1 which are suitable for carrying my invention into effect. In the form illustrated in Fig. 2, the transformer is provided with a core 33 comprising four legs, the two intermediate legs 34 and 35 being the winding legs and the two outer legs 36 and 37 being return magnetic paths individual to the respective winding legs. More than two return magnetic paths may be used as shown by a plan view in Fig. 4 in which the legs 36' and 36'' and 37' and 37'' represent the additional return magnetic paths. The character and number of the return paths depends upon the difference in phase or magnitude of the voltage applied to the primary windings or on other constructional details. The two independent primary windings 38 and 39, corresponding to windings 27 and 28 and 31 and 32 of Fig. 1, are placed on the winding legs 34 and 35, respectively. The secondary winding 40, corresponding to the secondary winding 26 or 30 of Fig. 1, comprises two portions or winding sections connected in series relation on the two winding legs 34 and 35. If the number of turns, wound on each core leg of the secondary winding, are equal, then obviously the ampere turns to supply the load current must be equally supplied by the two independent primary windings and by reason of this fact the transformer performs its balancing function. Since each of the primary windings has a magnetic return path for a portion of the magnetic flux, it is possible, in accordance with my invention, to apply a voltage differing in magnitude and phase to these two windings. The voltage induced in the single secondary winding is the algebraic sum of the voltages produced in each half of the winding on the two core legs. It will be noted that each primary winding is in close inductive relation with a portion of the secondary winding and also each primary winding is in loose inductive relation with the remaining portion of the secondary winding and to the other primary windings.

In Fig. 3 I have shown another form of transformer which is suitable for carrying my invention into effect. In this case I show a three-legged core 33' having the outer legs 34' and 35' as the winding legs and the middle leg 36' as the magnetic return path. In many cases, this form of transformer will function in the same manner as the form shown in Fig. 2 since the central leg 36' having no windings thereon is in a position to carry the algebraic sum or difference in magnitude and phase of the fluxes in the winding legs.

With the arrangements illustrated in Figs. 2 and 3, I, therefore, combine in one transformer a balancing action and a divided circuit so that the transformer can be used to balance current taken from the separate generator windings or separate generators and at the same time permit energization of a single feeder from a plurality of voltage sources differing in magnitude and phase. In the event of a short circuit on one of the primary windings, or the bus section or generator to which the winding is connected, a high reactance will be introduced to limit to a safe value the current fed to the short circuit from the other primary winding or from the high voltage secondary winding.

In Fig. 5 I have shown another embodiment of my invention which is adapted for a double bus system fed by double-winding generators. In this arrangement, illustrated by a one-line diagram, the two buses are indicated by the conductors 41 and 42 which are interconnected by a bus-tie reactor 43. Double winding generators 44 and 45 are connected to energize the buses 41 and 42 and may be of any suitable types known in the prior art such as the types disclosed in United States Letters Patent No. 2,046,992 granted July 7, 1936 upon an application of Philip L. Alger, or Reissue Patent 19,433 granted January 22, 1935 upon an application of Delmar C. Chase. The generators 44 and 45 are shown with an excitation means 44' and 45', respectively, very diagrammatically illustrated as comprising a field winding and a source of excitation. The generator 44 is provided with two separate windings 46 and 47 connected, respectively, to the buses 41 and 42. Similarly, the generator 45 is provided with two separate windings 48 and 49 connected, respectively, to the buses 41 and 42. A feeder or distribution circuit 50 is connected to be energized from a transformer 51 of the form shown in Fig. 2 or Fig. 3, having a high voltage secondary winding connected to feeder 50 and two separate primary windings connected to buses 41 and 42, respectively. In this arrangement the bus reactor 43 is interposed between the bus sections to which the respective windings of the double winding generator are connected in a manner similar to the connection of the separate single winding generators in Fig. 1. In a similar manner, a feeder or distribution circuit 55 is connected to be energized from the high voltage secondary winding of a transformer 56 of the form illustrated in Fig. 2 or 3, with a secondary winding 57 connected to the feeder 55 and primary windings 58 and 59 connected to the buses 41 and 42, respectively.

The arrangement illustrated in Fig. 5 provides a balancing action between the windings of each double-winding generator, permits a difference in phase and magnitude of the voltages applied to the respective primary windings of each transformer and provides a high reactance in the event of a short circuit on one primary winding and the circuits directly connected thereto to limit to a safe value the short circuit current from the other primary winding and directly connected sources, or from the high voltage secondary winding.

In Fig. 6 I have shown an embodiment of my invention for double-winding generators in a ring bus system and have shown the arrangement in full line diagram for a polyphase system. The ring bus is designated by the numeral 60 and is shown as comprising four bus sections 61, 62, 63, and 64. Between the respective bus sections, I interpose sectionalized reactors 65, 66, 67 and 68. The respective bus sections are energized by double-winding generators 69 and 70 which may be of the types indicated as being suitable for the embodiment of my invention illustrated in Fig. 5. The generator 69 is provided with two separate three-phase windings 71 and 72. The respective phase windings of winding 71 are connected to bus section 61, while the respective phase windings of winding 72 are connected to bus section 64. Similarly, generator 70 is provided with two separate windings 73 and 74. The respective phase windings of winding 73 are connected to the bus section 62 and the respective phase windings of winding 74 are connected to bus section 63. Thus each bus section is connected to be energized directly from a different winding of a double-winding generator and there are at least two bus reactors between the separate windings of a given machine, or one bus reactor between windings of different machines.

Two feeders or distributor circuits 75 and 76 are shown, by way of example, as illustrative of a plurality of feeders for energization from the bus 60. I employ a plurality of single-phase transformers of the form described in connection with the previous embodiments of my invention for energizing the feeders 75 and 76 from the bus 60, but a polyphase form of transformer incorporating the features of my single-phase transformer as shown in Figures 7 and 8 if preferred may be utilized. As illustrated in Fig. 6, I employ three single-phase transformers 77, 78 and 79 for energizing feeder 75. These transformers are provided with high voltage secondary windings 80, 81 and 82, respectively, connected in star. Transformer 77 is provided with two primary windings 84 and 85, transformer 78 with primary windings 86 and 87, and transformer 79 with primary windings 88 and 89. The primary windings 84, 86 and 88 are connected to be energized from the respective phases of bus section 61, while the primary windings 85, 87 and 89 are connected to be energized from the bus section 64. In other words, the feeder 75 receives its energization from bus sections 61 and 64, which sections in turn are directly energized from windings 71 and 72, respectively, of generator 69. Similarly, three single-phase transformers 90, 91 and 92 are provided to energize feeder 76. These transformers are provided with high voltage secondary windings 93, 94 and 95, respectively, connected in star. Transformer 90 is provided with two primary windings 96 and 97, transformer 91 with primary windings 98 and 99, and transformer 92 with primary windings 100 and 101. The primary windings 96, 98 and 100 are connected to the respective phases of bus section 62, while the associated primary windings 97, 99 and 101 are connected to the respective phases of bus section 63. The feeder 76 is thus connected to be energized from bus sections 62 and 63, which bus sections are in turn energized, respectively, from windings 73 and 74 of generator 70.

The arrangement shown in Fig. 6 provides the same features, as previously described, of balancing the currents taken from each of the two separate windings of a given source, or permitting the voltages of the separate windings to differ in magnitude and phase, and of limiting the short circuit currents from a given primary and its associated secondary winding to any other faulted primary circuit to a safe value.

In Fig. 7 I have shown a three phase form of transformer suitable for carrying my invention into effect comprising a double three-legged core 102, having six winding leg portions 103, 104, 105, 106 and 107, 108, and an intermediate yoke section 109 joining together all three legs of the core between the winding portions embraced respectively by the individual primary windings 110—115. Each pair of primary windings of corresponding phase (or windings of substantially the same phase) are positioned on opposite sides of the intermediate yoke member on winding legs having the same longitudinal axis. The respective phases of the secondary circuit identified as phases A, B, and C, each comprise respectively in series relation two winding sections 116, 117, 118, 119, and 120 and 121 arranged on the winding leg portions 103, 104; 105, 106 and 107 and 108 respectively. In this case the winding sections of a given phase winding are positioned on opposite sides of the intermediate yoke member on winding legs having the same longitudinal axis. By means of the intermediate yoke section this form of core will provide for carrying a flux in it which is the algebraic sum or difference of the fluxes, respectively, in the wound legs so long as the three-phase currents in each group of individual primary connections are equal to zero which is necessarily true in the case of three-wire, three-phase connections.

In case, however, a three-phase connection is used with a fourth or neutral connection interconnecting the generator and primary winding neutral points and the load or distribution circuit is provided with a neutral connection and loads connected thereto, it is quite possible that there will be an unbalanced single phase component of current in the loads which will result in the three line currents not adding up algebraically to zero. In such a case, in order properly to carry out my invention, it is desirable not only to use the intermediate yoke section as shown in Fig. 7 but additional magnetic return paths as shown in Fig. 8. For purposes of ease in comparison, the core structure and windings of Fig. 8 corresponding to similar elements of Fig. 7 have been assigned like reference numerals. A suitable arrangement of additional magnetic return paths is to provide legs 122 and 123 forming the outer legs of the core 102 and joined to the upper, lower and intermediate yoke portions of the core so as to form a continuous magnetic path with the respective yoke members for each winding section.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to obtain by Letters Patent of the United States is:

1. In combination, a load circuit, a plurality of voltage sources, and transforming means interconnecting said load circuit and said voltage sources comprising a core structure having a single secondary winding connected to said load circuit and a plurality of primary windings each connected to a different voltage source, said secondary and said primary windings being so positioned and inductively related on said core structure that the ampere turns to supply the current of said load circuit must be supplied in equal proportions by said voltage sources.

2. In combination, a load circuit, a plurality of voltage sources, and transforming means having a single secondary winding connected to said load circuit and a plurality of primary windings each connected to a different voltage source, said transformer having a core structure comprising a plurality of winding legs and a magnetic return path without windings thereon for said winding legs, said secondary winding having winding portions in series relation and with each winding portion arranged on a different winding leg, each of said primary windings being arranged on a different winding leg.

3. In combination, a load circuit, a plurality of voltage sources, and transforming means having a single secondary winding connected to said load circuit and a plurality of primary windings each connected to a different voltage source, said transformer having a core structure comprising a plurality of winding legs and magnetic return paths individual to each winding leg, said secondary winding having winding portions in series relation and with each winding portion arranged on a different winding leg, each of said primary windings being arranged on a different winding leg.

4. In a system of distribution, a distribution bus comprising a pair of bus sections, inductive reactance interconnecting said bus sections, a source of voltage connected to each bus section, a load circuit to be energized from said voltage sources, and transforming means interconnecting said load circuit and said bus sections and having a plurality of primary windings each connected to a different bus section and a single secondary winding connected to said load circuit and associated with said primary windings in such a manner as to permit a difference in phase and magnitude between the voltages of said bus sections.

5. In a system of distribution, a distribution bus comprising a pair of bus sections, inductive reactance interconnecting said bus sections, a pair of generator windings each connected to different bus sections, a load circuit to be energized from said generator windings, and transforming means having a single secondary winding connected to said load circuit and a pair of primary windings each connected to a different bus section, said transformer having a multi-legged core structure having a pair of winding legs and a magnetic return path without windings thereon for said winding legs, said secondary winding having two winding portions in series relation and with each winding portion arranged on a different winding leg, each of said primary windings being arranged on a different winding leg.

6. In a system of distribution, a distribution bus comprising a pair of bus sections, inductive reactance interconnecting said bus sections, a pair of generator windings each connected to different bus sections, a load circuit to be energized from said generator windings, and transforming means having a single secondary winding connected to said load circuit and a pair of primary windings each connected to a different bus section, said transformer having a multi-legged core structure having a pair of winding legs and a magnetic return path individual to each winding leg, said secondary winding having two winding portions in series relation and with each winding portion arranged on a different winding leg, each of said primary windings being arranged on a different winding leg.

7. In a system of distribution, a distribution bus comprising a pair of bus sections, a current limiting reactor interconnecting said bus sections, a double-winding generator having each winding connected to a different bus section, a high voltage feeder circuit connected to be energized from said generator, and a transformer having a single secondary winding connected to said feeder and a pair of primary windings each connected to a different bus section, said transformer having a four-legged core structure with the two intermediate legs constituting winding legs and the respective outside legs constituting a magnetic return path for a different winding leg, said secondary winding comprising two equal winding portions in series relation and with each winding portion positioned on a different winding leg, each of said primary windings being positioned on a different winding leg.

8. In combination, a load circuit, a plurality of supply circuits, and a transformer provided with a core structure and having a secondary winding connected to said load circuit and a plurality of primary windings each connected to a different supply circuit, each of said primary windings being wound in close inductive relation with certain turns of said secondary winding and in loose inductive relation to the remaining turns of said secondary winding and to each other so that in the event of a fault or short circuit in one of said primary winding circuits the reactance to the flow of current from the other of said primary windings will be sufficiently high to limit the current flow to such fault or short circuit to a safe value.

9. In combination, a load circuit, a plurality of supply circuits, an inductive reactance between said supply circuits, and a transformer having a secondary winding connected to said load circuit and a plurality of primary windings each connected to a different supply circuit, said transforming means having a multi-legged core with winding legs and magnetic return paths for each winding leg, said secondary winding comprising a plurality of winding sections in series relation and with each winding section arranged on a different winding leg, each of said primary windings being arranged on a different winding leg in close inductive relation with the secondary winding section on its associated leg and in loose inductive relation with the remaining sections of said secondary winding so that the voltages of said supply circuits may differ in magnitude and phase, the currents supplied by each supply circuit will be equal and the reactance to fault currents to any one primary winding circuit will be substantially higher than when each supply circuit supplies its normal proportion of the total current to said load circuit.

10. In a system of distribution, a distribution bus comprising a pair of bus sections, a reactance connected between said bus sections, a pair of generator windings each connected to a different bus section, a load circuit to be energized from said generator windings, and a transformer having a secondary winding connected to said load circuit and a pair of primary windings each connected to a different bus section, said transforming means having a core structure comprising two winding legs and a magnetic return path for each winding leg, said secondary winding comprising two equal winding sections in series relation and with each winding section positioned on a different winding leg, each of said primary windings being positioned on a different winding leg in close inductive relation with the secondary winding section on its associated leg and in loose inductive relation with the remaining secondary winding sections and to each other.

11. In a system of distribution, a polyphase distribution bus comprising a pair of bus sections, a reactance connected between said bus sections, a pair of polyphase generator windings each connected to a different bus section, a polyphase load circuit energized from said generator windings, and transforming means having a secondary winding for each phase of said load circuit connected to said load circuit and a pair of primary windings inductively associated with each phase of said secondary winding, each phase of each secondary winding and its associated pair of primary windings being provided with a magnetic core of two winding legs and a magnetic return path for each winding leg, each secondary winding of each phase comprising two winding sections in series relation and with each winding section on different winding legs of the core of each phase, each pair of primary windings of each phase being on different winding legs of the core of each phase, one primary winding of each pair of primary windings being connected to one bus section and the remaining primary winding of each pair being connected to a different bus section.

12. In a system of the class described, a transformer having a multi-legged core comprising a plurality of winding legs and a magnetic return path individual to each winding leg, a single secondary winding comprising a plurality of winding sections in series relation and with each winding section positioned on a different winding leg, and a plurality of primary windings each of which is positioned on a different winding leg.

13. Means for interconnecting a single load circuit and a plurality of voltage sources comprising a multiple-winding transformer having a multi-legged core structure with a plurality of winding legs and a magnetic return path individual to each winding leg, a single secondary winding having winding sections on each winding leg with said sections connected in series relation and a primary winding on each winding leg so that voltages differing in magnitude and phase may be applied to the respective primary windings with currents or ampere turns of each primary winding maintained equal.

14. Means for interconnecting a single load circuit and a plurality of voltage sources comprising a three-winding transformer having a multi-legged core with a pair of winding legs and a magnetic return path individual to each winding leg, a single secondary winding comprising two winding sections in series relation and with each winding section positioned on a different winding leg, and a plurality of separately insulated primary windings each positioned on a different winding leg in close inductive relation with the secondary winding section on its associated leg and in loose inductive relation with the remaining secondary winding sections and to each other.

15. Means for interconnecting a single polyphase circuit and a plurality of polyphase circuits comprising a multiple-winding polyphase transformer having a core provided with a plurality of winding legs for each phase of said transformer, two outer yoke members and an intermediate yoke member joining said winding legs, a winding for each phase of said transformer, each phase winding comprising a plurality of winding sections connected in series relation and with each winding section of a given phase positioned on a different winding leg of the same transformer phase, and a plurality of separately insulated windings of the same phase, each of said separately insulated windings of a given phase being positioned respectively on different winding legs embraced by said winding sections of the same phase.

16. Means for interconnecting a single three-phase load circuit and a plurality of three phase voltage sources comprising a multiple-winding three-phase transformer having a core provided with two winding legs in each phase on the same longitudinal axis, two outer yoke members and an intermediate yoke member joining said winding legs, said intermediate yoke member constituting a return magnetic path for the algebraic resultant of the fluxes respectively in the various winding legs, a secondary winding for each phase comprising a pair of winding sections connected in series relation and with each winding section of each phase positioned on opposite sides of said intermediate yoke section on winding legs having the same longitudinal axis, and a pair of separately insulated primary windings of corresponding phase for each phase winding of said secondary winding with each winding of said pair of windings of a given phase arranged on opposite sides of said intermediate yoke section on winding legs having the same longitudinal axis.

17. Means for interconnecting a single polyphase circuit and a plurality of polyphase circuits comprising a multiple-winding polyphase transformer having a core provided with a plurality of winding legs for each phase of said transformer constituting outer leg members and intermediate leg members, a magnetic return path associated with each pair of outer leg members, two outer yoke members and an intermediate yoke member joining said leg members, a winding for each phase of said transformer, each winding comprising a plurality of winding sections connected in series relation and with each winding section of a given phase positioned on a different winding leg of the same transformer phase, and a plurality of separately insulated windings of the same phase, each of said separately insulated windings of a given phase being positioned respectively on different winding legs embraced by said winding sections of the same phase.

18. Means for interconnecting a single three-phase four-wire load circuit and a plurality of three-phase four-wire voltage sources comprising a multiple winding three-phase transformer having a core provided with two winding legs in each phase on the same longitudinal axis, the respective pairs of winding legs constituting two outer winding legs and an intermediate winding leg, a magnetic return path associated with and constituting a pair of outer core legs to each of said outer winding legs, two outer yoke members and an intermediate yoke member joining all of said legs, a secondary winding for each phase comprising a pair of winding sections connected in series relation and with each winding section of each phase positioned on opposite sides of said intermediate yoke section on winding legs having the same longitudinal axis, and a pair of separately insulated primary windings of corresponding phase for each phase winding of said secondary winding with each winding of said pair of windings of a given phase arranged on opposite sides of said intermediate yoke section on winding legs having the same longitudinal axis.

FREDERICK F. BRAND.